July 19, 1966 M. R. AARON 3,261,920
ASYNCHRONOUS PULSE MULTIPLEXING
Filed Dec. 1. 1961

INVENTOR
M. R. AARON
BY R. B. Anderson
ATTORNEY

United States Patent Office 3,261,920

Patented July 19, 1966

3,261,920

ASYNCHRONOUS PULSE MULTIPLEXING

Marvin R. Aaron, Whippany, N.J., assignor to Bell Telephone Laboratories, Incorporated, New York, N.Y., a corporation of New York

Filed Dec. 1, 1961, Ser. No. 156,242

2 Claims. (Cl. 179—15)

This invention relates to multiplex communication and more particularly to asynchronous pulse multiplexing systems in which the various transmitters whose pulse signals are to be multiplexed are independent of one another.

As is well known intelligence may be transmitted by means of pulse trains, and trains of binary pulses are frequently employed to carry information regarding data or an analog function such as speech. Frequently it is desired to provide for the multichannel transmission of such intelligence bearing pulse trains, and for this purpose pulse multiplexing techniques are employed. There are three classes of pulse multiplexing systems. The best known is synchronous multiplexing in which all the pulse transmitters have the same fundamental repetition frequency and multiplexing is accomplished by the time domain interleaving of pulses. To avoid the complexities of the distribution apparatus required at the receiver in synchronous systems the so-called semi-synchronous system was devised in which pulse signals from each transmitter bear their own address and sorting is accomplished at the receiver by way of suitable recognition apparatus. In the third class of multiplexing systems the transmitters are independent of one another but each transmitter must transmit some relatively complex additional information in order to identify the signals from each of the transmitters at the receiving end of the system. The usual manner of sending this additional information is by having each transmitter generate a predetermined number of pulses at predetermined intervals of time and with a predetermined amplitude distribution. At the receiving end of such a system relatively complex equipment is needed to separate the signals emanating from the various transmitters.

It is an object of this invention to eliminate the necessity for generating relatively complex identifying information in an asynchronous pulse multiplexing system.

It is a related object of this invention to eliminate the necessity for relatively complex equipment to identify the signals from the transmitters at both the receiving and transmitting ends of the system.

In accordance with this invention differences in pulse height and width are used to identify the pulses emanating from each of the pulse transmitters. The pulse trains from the various transmitters are independent of one another in frequency and phase but a predetermined amplitude relationship and a predetermined width relationship must exist between the pulses. These non-orthogonal pulse trains are added together at the transmitting end of the system to form a sum of these pulse signals which is then transmitted over a transmission medium. At the receiving end of the system non-linear techniques using relatively simple and inexpensive apparatus are used to separate the pulses originating from the various transmitters.

This invention will be more fully comprehended from the following detailed description, taken in conjunction with the drawings, in which.

Figure 1:
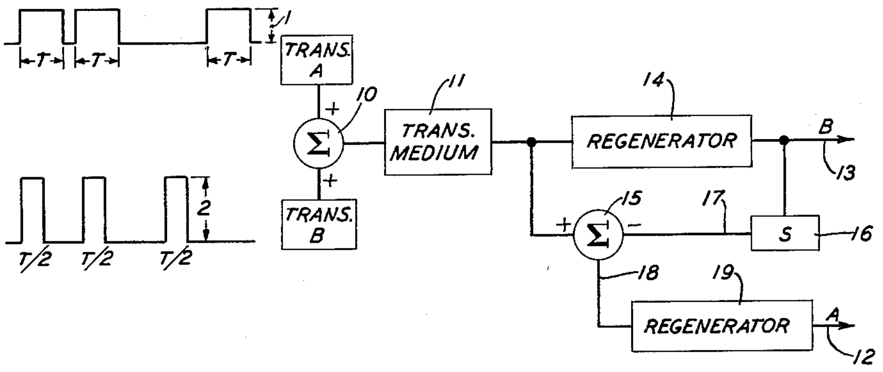
FIG. 1 is a block diagram of a multiplexing system embodying the invention.

In the embodiment of the invention shown in FIG. 1 pulse signals emanating from transmitter A and transmitter B are added together in preparation for transmission. Transmitter A and transmitter B are totally independent of one another in that the rate at which they generate pulses does not affect the operation of the system. Indeed, the rate at which each of them generates pulses may be determined by separate noise sources so that each transmitter generates pulses in response to its respective noise source and the pulses from one transmitter may or may not overlap pulses generated by the other transmitter where these pulses are considered in the time domain. In addition, these pulses are independent in that they are not separated in the frequency domain. As a result, the pulse signals emanating from transmitter A and transmitter B, since they are separated in neither the frequency nor time domain, are non-orthogonal. The only relationships required between the pulses emanating from transmitter A and transmitter B are that the pulses from each transmiter must have a fixed height and the amplitude of the pulses from one transmitter must bear a constant relationship to the pulses emanating from the second transmitter, and the pulses must also bear a fixed width relationship to one another.

The signals are added together by adder 10 which may be, for example, the adder shown in FIG. 1.7*d* on page 11 of "Electronic Analog Computers" by Korn and Korn, first edition, 1952, published by the McGraw-Hill Book Company and applied to a transmission medium 11 which may be, for example, a frequency modulated transmitter which the sum of the non-orthogonal signals modulates. At the receiving end of the system differences in spatial content are used together with non-linear techniques to separate the pulse trains emanating from transmitter A and transmitter B so that pulse train A appears at output terminal 12 and pulse B train appears at output terminal 13.

In accordance with this invention the pulse signals emanating from each of the transmitters are separated in the multiplexing system shown in FIG. 1 by applying the received signal to an untimed regenerator 14 and an analog subtractor 15. The regenerator 14 may comprise, for example, a simple blocking oscillator which has its input threshold set to a value greater than the amplitude of the pulses generated by the transmitter A but less than the amplitude of the pulses generated by transmitter B. In the embodiment of the invention shown in FIG. 1 the amplitude of the pulses generated by transmitter A is unity amplitude while the amplitude of the pulses generated by transmitter B is twice unity amplitude. The threshold level of regenerator 14 is set, for example, at one and a half times the amplitude of the pulses generated by transmitter A so that a pulse output appears at terminal 13 whenever the received signal is greater than one and a half times the amplitude of the pulses from transmitter A. This output pulse, which has the same amplitude and width as a pulse from transmitter B is applied to a shaping network 16 as well as to output terminal 13. Shaper 16 is a filter which has the same characteristics as the transmission medium 11 so that the pulses B appearing at its output terminal 17, which is connected to the second input of analog subtractor 15, have the same shape as the pulses received from transmitter B. For example, if the transmission medium 11 has a Gaussian characteristic then filter 16 has a Gaussian characteristic. The resulting output of analog subtractor 15 as it appears at its output terminal 18 therefore consists of the pulses from transmitter A and these pulses are then regenerated by regenerator 19 which has its threshold level set, for example, at an amplitude equal to one half the amplitude of the pulses from transmitter A.

Thus in accordance with this invention the pulse signals to be multiplexed are totally independent of one another except that the pulses from one pulse train must bear a constant amplitude relationship to the pulses from the other pulse train. In the embodiment of the invention described above the pulses from the second pulse train have an amplitude twice that of the first pulse train and the signals were separated on that basis. It should be understood that the amplitude of the pulses from the second transmitter need only exceed those from the first transmitter by a small amount and that they could have had another amplitude relationship to one another than two to one. The separation apparatus can, by suitable modification of the levels at which the regenerators generated an output pulse, distinguish the two pulse trains even if the amplitude of their pulses differ by only a small amount. In addition, it should be recognized that more than two pulse trains may be multiplexed in the above-described manner. This, of course, requires more elaborate circuitry to distinguish the pulses emanating from each pulse train, and the pulses from each of the transmitters must have a different amplitude.

Thus, where three transmiters are to be multiplexed the pulse heights can have the amplitude relationship 1 to 2 to 4. Actually any amplitude relationship may be used provided each succeeding pulse height as expressed in the relationship is greater than the preceding pulse height, and each pulse height as expressed in the relationship is greater than the sum of all preceding heights.

In accordance with this invention the circuitry shown in FIG. 1 may be employed with pulse signals which occur at regular intervals. That is, in the situation where the pulses emanating from transmitters A and B occur at regular intervals (i.e., each has a fundamental repetition frequency which is different from the other) the circuitry shown in FIG. 1 may be employed to separate, at the receiver, the pulses emanating from each transmitter. The pulse trains from transmitters A and B need not be synchronized with one another and the output of adder 10 is still a non-orthogonal signal as explained above. In such a multiplexing system separation of the pulses may be carried on more accurately since this permits the use of timed regenerators. As an example the pulses from the transmitter B may, for example, have one half the width of the pulses generated by transmitter A and twice the fundamental repetition frequency. The regenerator 14 then has within itself a simple resonant circuit which is tuned to the fundamental repetition frequency of the pulses generated by transmitter B and thereby times regenerator 14. Regenerator 19 is also self-timed having a resonant circuit tuned to the fundamental repetition frequency of the wide pulses emanating from transmitter A.

Thus in accordance with this invention the separation equipment may employ self-timed regenerators with the only additional requirement placed on the system that of having each transmitter generate pulses having a predetermined pulse repetition frequency. The pulse signals from the transmitters do not have to be synchronized with each other and therefore the signal transmitted is still non-orthogonal. As before, such a multiplexing system may be employed for multiplexing a multiplicity of signals and each transmitter must transmit pulses which occur at regular intervals and each must have a different fundamental repetition frequency.

Figure 2:
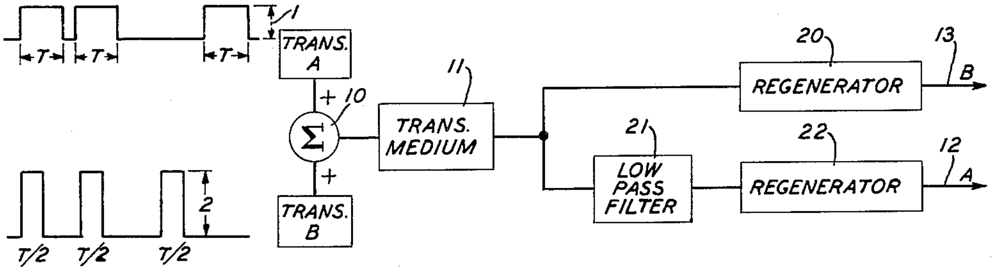
FIG. 2 is a block diagram of a second multiplexing system embodying the invention.

In the embodiment of the invention shown in FIG. 2 pulse signals emanating from transmitter A and transmitter B which are non-orthogonal are added together in preparation for transmission. As in the case of the first embodiment of the invention shown in FIG. 1 these transmitters are totally independent of one another in that the rate at which they generate pulses does not affect the operation of the system. The pulses generated by the two transmitters are non-orthogonal because they overlap when they are considered in the time domain and in addition they are not separated in the frequency domain. The only relationships required between the pulses emanating from transmitter A and transmitter B are that the pulses from each transmitter must have a fixed height and the amplitude of the pulses from one transmitter must bear a constant relationship to the pulses emanating from the second transmitter, and the pulses must also bear a fixed width relationship to one another. After transmission through medium 11 differences in spectral content are used together with non-linear techniques so that pulse train A appears at output terminal 12 and pulse train B appears at output terminal 13.

In accordance with this invention the pulses emanating from each of the transmitters are separated in the multiplexing system shown in FIG. 2 by applying the received signal to an untimed regenerator 20 and a low-pass filter 21. The regenerator 20 may be a simple blocking oscillator which has its input threshold set to a value greater than the amplitude of the pulses generated by the transmitter A but less than the amplitude of the pulses generated by transmitter B. In the embodiment of the invention shown in FIG. 2, the amplitude of the pulses generated by transmitter A is unity amplitude while the amplitude of the pulses generated by transmitter B is twice unity amplitude. The threshold level of regenerator 20 is set, for example, at one and a half times the amplitude of the pulses generated by transmitter A so that a pulse output appears at terminal 13 whenever the received signal is greater than one and a half times the amplitude of the pulses from transmitter A.

The received signals are also applied to a low-pass filter 21. The pulses emanating from transmitter A are wider than the pulses emanating from transmitter B and are shown in FIG. 2, for example, as having twice the width of the pulses from transmitter B. The low-pass filter sharply attenuates the relatively narrow pulses emanating from transmitter B so that the output of the low-pass filter 21 consists primarily of the pulses emanating from transmitter A. These pulses are regenerated by regenerator 22, which may be, for example, a simple blocking oscillator whose threshold level may be set, for example, to one half the amplitude of the pulses from transmitter A so that whenever the output of filter 21 exceeds that threshold level regenerator 22 generates an output pulse at terminal 12.

Thus, to summarize, in the embodiment of the invention shown in FIG. 2 the pulse signals to be multiplexed are totally independent of one another except that the pulses from the transmitters must have different widths and the pulses from one pulse train must bear a constant amplitude relationship to the pulses from the other pulse train. In the embodiment of the invention shown in FIG. 2 the pulses from one pulse train have twice the amplitude and one half the width of the pulses from the other pulse train. It should be emphasized that these are not limitations and that other relationships can exist. For example, with regard to the amplitude relationship, the pulse heights can differ by only a small value, and they can have another amplitude relationship to one another other than two to one. With regard to the width relationship, the only real requirement is that low-pass filter attenuate the narrow pulses and pass the wide pulses, and the pulse signals could, therefore have had another width relationship other than two to one. Finally, it should be recognized that more than two pulse trains may be multiplexed in the above-described manner. This, of course, requires more elaborate circuitry to distinguish the pulses emanating from each pulse train, and the pulses from each of the transmitters must have a different amplitude and width. Thus, where the signals from three transmitters are to be multiplexed the pulse heights can bear the amplitude relationship 1 to 2 to 4. Actually any amplitude relationship may be used provided each succeeding pulse height as expressed in the relationship is greater than the preceding pulse height, and each pulse height as expressed in the relationship is greater than the sum of all preceding pulse heights. The only width relationship required is that the filters employed to pass the pulses from any given transmitter attenuate the pulses from the other transmitters and where the signals from three transmitters are to be multiplexed the pulse widths might bear the relationship 1 to 2 to 4 in order that relatively simple filters may be employed.

As in the case of the embodiment shown in FIG. 1 the circuitry shown in FIG. 2 may be employed to multiplex signals which occur at regular intervals. In such a case self-timed regenerators may be employed with the attendant advantages of more accurate regeneration.

Figure 3:
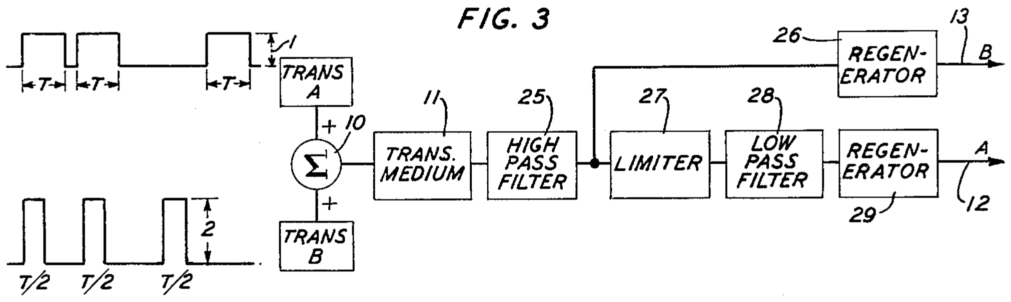
FIG. 3 is a block diagram of a third multiplexing system embodying the invention.

In accordance with this invention the pulse signals emanating from transmitters A and B which are non-orthogonal signals may be added together, transmitted and separated at the receiver by means of a third embodiment of the invention shown in FIG. 3. Again the only relationships required between the pulse signals emanating from transmitters A and B are that the pulses must have a fixed height and the amplitude of the pulses from one transmitter must bear a constant relationship to the amplitude of the pulses emanating from the second transmitter, and the pulses from one transmitter must also bear a fixed width relationship to the pulses emanating from the other transmitter.

The pulses emanating from each of the transmitters are separated in the multiplexing system shown in FIG. 3 by first applying the received signal to a high-pass filter 25. As in the embodiment shown in FIG. 2 the pulses emanating from transmitter A are wider than the pulses emanating from transmitter B and are shown in FIG. 3, for example, as having twice the width of the pulses from transmitter B. The high-pass filter 25 sharply attenuates the relatively wide pulses emanating from transmitter A so that the output of the high-pass filter 25 consists primarily of the relatively narrow pulses emanating from transmitter B. The output of the high-pass filter 25 is directly applied to a regenerator 26 which may be, for example, a simple blocking oscillator. The regenerator 26 has its input threshold set to a value greater than the amplitude of the pulses generated by the transmitter A at the output of the high-pass filter, but less than the amplitude of the pulses generated by transmitter B at the output of the high-pass filter. In the embodiment of the invention shown in FIG. 3 the amplitude of the pulses generated by transmitter A is unity amplitude while the amplitude of the pulses generated by transmitter B is twice unity amplitude. The threshold level of regenerator 26 is set, for example, at one and a half times the amplitude of the pulses generated by transmitter A so that a pulse appears at terminal 13 whenever the received signal is greater than one and a half times the amplitude of the pulses from transmitter A.

The output of the high-pass filter 25 is also applied to a limiter 27 which reduces the amplitude of the pulses from transmitter B and whose output is applied to a low-pass filter 28 which further discriminates against the pulses from transmitter B and enhances the pulses of system A. The output of the low-pass filter 28 is applied to a regenerator 29, which may be a simple blocking oscillator, whose threshold is set to one half the amplitude of the pulses emanating from transmitter A and which generates an output pulse on terminal 13 whenever a pulse from transmitter A is received.

As discussed above in connection with the other embodiments of the invention the amplitude and width relationships discussed above are not limitations and other relationships can be employed. Also more than two pulse trains may be multiplexed, and, finally, where the pulse signals occur at regular intervals self-timed regenerators may be used to provide more accurate regeneration.

It is to be understood that the above-described arrangements are illustrative of the application of the invention. Numerous other arrangements may be devised by those skilled in the art without departing from the spirit and scope of the invention.

What is claimed is:

1. In a system for asynchronously multiplexing information bearing pulse trains, two pulse transmitters each of which generates an intelligence bearing pulse train which is independent of the pulse train generated by the other transmitter in both phase and frequency relationship but with the amplitude of the pulses generated by a first of said pulse transmitters being twice the amplitude of the pulses generated by the second of said pulse transmitters and having one-half the pulse width of the pulses generated by the second of said pulse transmitters, means to add the pulse trains generated by said pulse transmitters so that an overlapping sum of said pulse trains is produced, means to transmit said overlapping sum signal over a transmission medium, a receiver to receive the transmitted signal, means at said reciver responsive to the received signal to separate the pulse trains emanating from said pulse transmitters comprising a first regenerator to which the received signal is applied which generates a pulse at a first output terminal when the received signal is greater in amplitude than one and one-half times the amplitude of the pulses received from the second pulse transmitter, a filter having an input terminal, an output terminal and a transmission characteristic identical to that of the transmission medium, said input terminal of said filter being connected to said first output terminal, an analog subtractor having two input terminals and an output terminal the output terminal of said filter being connected to one of said input terminals of said analog subtractor the second input terminal of said subtractor being connected to receive the transmitted signal so that the signal at the output terminal of said subtractor comprises substantially the pulses from said second pulse transmitter, and a regenerator having an input terminal and an output terminal the input terminal being connected to the output terminal of said subtractor to generate an output pulse at its output terminal whenever a pulse is received which is greater in amplitude than one-half the amplitude of a pulse received from said second transmitter.

2. The system in accordance with claim 1 wherein each of said pulse transmitters generates pulses having a fundamental repetition frequency which is different from the fundamental repetition frequency of the other transmitter and said first and second regenerators each employ a self-timing circuit to time the occurrence of the generation of an output pulse.

References Cited by the Examiner

UNITED STATES PATENTS

| | | | |
|---|---|---|---|
| 2,381,847 | 8/1945 | Ullrich | 179—15 |
| 2,425,066 | 8/1947 | Labin et al. | 179—15 |
| 2,429,616 | 10/1947 | Grieg | 179—15 |

DAVID G. REDINBAUGH, *Primary Examiner.*

R. L. GRIFFIN, *Assistant Examiner.*